US006030681A

United States Patent [19]

Czubarow et al.

[11] Patent Number: 6,030,681

[45] Date of Patent: Feb. 29, 2000

[54] MAGNETIC DISK COMPRISING A SUBSTRATE WITH A CERMET LAYER ON A PORCELAIN

[75] Inventors: Pawel Czubarow, Menlo Park; Karin M. Kinsman, San Mateo; Amy S. Chu, Oakland; Christian Weber, Redwood City; Ryan Dupon, San Carlos; Anthony Evans, Woodside, all of Calif.

[73] Assignee: Raychem Corporation, Menlo Park, Calif.

[21] Appl. No.: 08/890,912

[22] Filed: Jul. 10, 1997

[51] Int. Cl.[7] .................... G11B 5/82

[52] U.S. Cl. .................... 428/65.3; 428/336; 428/694 ST; 428/694 TS; 428/694 TP; 428/694 SG; 428/900; 427/129; 427/555; 65/30.1; 65/32.4

[58] Field of Search .................... 428/336, 65.3, 428/694 ST, 694 TS, 694 TP, 694 SG, 900; 427/129, 555; 65/30.1, 32.4

[56] References Cited

U.S. PATENT DOCUMENTS

| | | | |
|---|---|---|---|
| 1,658,334 | 2/1928 | Holmgren . | |
| 1,927,830 | 9/1933 | Harrington | 25/145 |
| 1,941,506 | 1/1934 | Witter | 75/17 |
| 3,012,902 | 12/1961 | Bayer | 117/33.3 |
| 3,472,688 | 10/1969 | Hayashi et al. | 117/212 |
| 3,568,723 | 3/1971 | Sowards | 138/143 |
| 3,790,360 | 2/1974 | Kato | 65/32 |
| 3,802,892 | 4/1974 | Pirooz | 106/52 |
| 3,808,574 | 4/1974 | De Luca | 338/258 |
| 3,892,904 | 7/1975 | Tanaka | 428/209 |
| 3,900,305 | 8/1975 | DeLuca | 65/30 |
| 3,985,919 | 10/1976 | Pinch et al. | 427/101 |

(List continued on next page.)

FOREIGN PATENT DOCUMENTS

| | | | |
|---|---|---|---|
| 762982 | 7/1967 | Canada . | |
| 2533524 | 3/1977 | Germany . | |
| 650173 | 2/1951 | United Kingdom . | |
| WO 97/21977 | 6/1997 | WIPO | G01B 7/34 |

OTHER PUBLICATIONS

Patent Abstract of Japan vol. 009 No. 193 (E–334), Aug. 9, 1985 (Abstract of JP 60–059765 (Mitsubishi).

Osaka et al., J. Electrochem. Soc. vol. 132 (9), pp. 2081–2084.

McGraw Hill Dictionary of Scientific and Technical Terms, 5th Ed., p. 341 ("cermet").

Ohara Corp., borchusre entitled "Crystallized Glass–TS Series" (undated).

Ashar, Magnetic Disk Drive Technology, pp. 163–197 (IEEE Press 1997).

Polinski, Solid State Technol., pp. 31–35, 58 (May 1973).

Pesic, Microelect. J., vol. 19, No. 4, pp. 71–87 (1988).

Chem. Abs. 80:62923CA (abstract of Ishizuka Glass, JP 48–070715 (1973)).

Newkirk et al., J. Mater. Res. 1(1), pp. 81–89 (Jan./Feb. 1986).

Steier et al., J. Am. Ceram. Soc., 78(9), pp. 2560–2562 (1955).

Sainz et al., J. Am. Ceram. Soc., 76(7), pp. 1869–1872 (1993).

Hoffman., Ceram. Bull, 42(12), pp. 490–493 (1963).

IEEE Trans. Parts, Hybrids, Packaging, vol. PHP–10, No. 1, pp. 74–81 (Mar. 1974).

*Primary Examiner*—Stevan A. Resan

*Attorney, Agent, or Firm*—Herbert G. Burkard; Yuan Chao

[57] ABSTRACT

A method of forming an article having a cermet layer on a porcelain substrate, via the steps of (a) providing a substrate made a porcelain comprising one or more crystalline oxide phases dispersed in a glassy matrix, the glassy matrix containing 0.25 to 45.0 weight % of a reducible metal oxide having a reduction potential of between −1.0 and +3.5 E°/V; and (b) heating the substrate in a reducing atmosphere to form on at least one surface of the substrate a layer of cermet comprising elemental metal which is a reduction product of the reducible metal oxide. The article may be used as a substrate for magnetic recording disks.

22 Claims, 2 Drawing Sheets

U.S. PATENT DOCUMENTS

| | | | |
|---|---|---|---|
| 4,017,291 | 4/1977 | Gliemeroth et al. | 65/30 R |
| 4,030,903 | 6/1977 | Rittler | 65/32 |
| 4,038,216 | 7/1977 | Henrich et al. | 252/514 |
| 4,071,426 | 1/1978 | Pinch et al. | 204/192 F |
| 4,073,846 | 2/1978 | Masumura et al. | 264/65 |
| 4,115,228 | 9/1978 | Henrich et al. | 204/192 EC |
| 4,145,470 | 3/1979 | Matsuura | 428/336 |
| 4,159,414 | 6/1979 | Suh et al. | 219/121 LM |
| 4,311,729 | 1/1982 | Itakura et al. | 427/80 |
| 4,329,016 | 5/1982 | Chen | 360/96.12 |
| 4,383,855 | 5/1983 | Aaron et al. | 419/19 |
| 4,397,963 | 8/1983 | Morgan | 501/127 |
| 4,541,974 | 9/1985 | Yamaoka et al. | 264/61 |
| 4,541,975 | 9/1985 | Honma et al. | 264/62 |
| 4,663,826 | 5/1987 | Baeuerle | 29/571 |
| 4,756,754 | 7/1988 | SinghDeo | 75/233 |
| 4,808,463 | 2/1989 | Yoshikatsu et al. | 428/215 |
| 4,836,837 | 6/1989 | Rapp | 65/3.3 |
| 4,847,139 | 7/1989 | Boylan et al. | 428/209 |
| 4,876,117 | 10/1989 | Bornstein | 427/130 |
| 4,880,770 | 11/1989 | Mir et al. | 505/1 |
| 4,987,515 | 1/1991 | Iwaya et al. | 361/321 |
| 5,064,788 | 11/1991 | Newkirk et al. | 501/92 |
| 5,080,948 | 1/1992 | Morita et al. | 428/64 |
| 5,091,820 | 2/1992 | Iwaya et al. | 361/304 |
| 5,106,796 | 4/1992 | Drozdyk et al. | 501/137 |
| 5,108,781 | 4/1992 | Ranjan et al. | 427/53.1 |
| 5,162,959 | 11/1992 | Arin et al. | 360/105 |
| 5,170,300 | 12/1992 | Stefansky | 360/105 |
| 5,218,491 | 6/1993 | Nishida et al. | 360/73.03 |
| 5,218,496 | 6/1993 | Kaczens | 360/106 |
| 5,227,936 | 7/1993 | Strickler et al. | 360/97.02 |
| 5,231,556 | 7/1993 | Blanks | 360/105 |
| 5,303,099 | 4/1994 | Kawazoe | 360/103 |
| 5,405,646 | 4/1995 | Nanis | 427/131 |
| 5,405,704 | 4/1995 | Waibel et al. | 428/472 |
| 5,446,606 | 8/1995 | Brunner et al. | 360/75 |
| 5,461,015 | 10/1995 | Kinsman et al. | 501/141 |
| 5,618,611 | 4/1997 | Jin et al. | 428/209 |
| 5,720,859 | 2/1998 | Czubarow et al. | 204/157.43 |
| 5,726,108 | 3/1998 | Taguchi | 501/5 |

MAGNETIC DISK COMPRISING A SUBSTRATE WITH A CERMET LAYER ON A PORCELAIN

BACKGROUND OF THE INVENTION

Magnetic hard disk drives, also known as Winchester drives, serve as the principal information storage component in many computer systems. A typical hard disk drive contains a stack of one or more magnetically recordable and readable disks, each made of a non-magnetic disk-shaped substrate coated with a magnetic recording medium on one or both sides. The predominant substrate of commercial drives is aluminum, but other substrates such as glass, ceramics, and glass-ceramics have also been employed.

The trend in the personal computer industry is towards more complex operating system and applications software and larger data files such as spreadsheets, databases, and graphics, resulting in a need for hard disk drives with increased storage capacity. At the same time, there is a trend towards compactness, as evidenced by the increasing popularity of notebook and lap-top computers and portable storage devices. The result is two seemingly contradictory demands on hard disk drives: increased storage capacity and smaller physical size. To exacerbate the problem, there exist de facto size and shape standards for hard disk drives, in the form of the space allocated to the hard disk drive by a computer's manufacturer: a hard disk drive manufacturer seeking to introduce a higher capacity hard disk drive as an upgrade feature for a computer has little flexibility and must design the new drive to fit into the space allocated by the manufacturer for the original-equipment drive. One way to increase storage capacity is to make the disks themselves thinner, so that a drive with unchanged exterior dimensions can contain more disks—i.e., more storage space. Since the substrate accounts for an overwhelming proportion of the thickness of a disk, this means, in turn, thinner substrates.

Ceramics and glass-ceramics have been proposed as alternatives to aluminum for making thinner substrate disks, because aluminum is comparatively not as stiff and is subject to warping. Representative disclosures include Goto et al., U.S. Pat. No. 5,567,217 (1996); Ishizaki et al., U.S. Pat. No. 5,561,089 (1996); Kawashima et al., U.S. Pat. No. 5,532,194 (1996); Nakagawa et al., U.S. Pat. No. 5,494,721 (1996); Yamakawa et al., U.S. Pat. No. 5,165,981 (1992); Kondo et al., U.S. Pat. No. 5,008,176 (1991); Alpha et al., U.S. Pat. No. 4,971,932 (1990); Yoshikatsu et al., U.S. Pat. No. 4,808,463 (1989); Wada et al., U.S. Pat. No. 4,808,455 (1989); Matsumoto, U.S. Pat. No. 4,738,885 (1988); and Wada et al., U.S. Pat. No. 4,690,846 (1996).

The compliance, or deflection per unit load, of hard disk substrates varies approximately with the cube of the thickness. This implies that, to achieve the same rigidity in a 15 mil thick disk (a proposed standard for disks in the future) as in a 25 mil disk, a 4.6-fold increase in the elastic modulus of the substrate material is required even though a thinner disk will be subject to lower inertial loads, e.g. during a shock event such as a fall. While aluminum has a modulus of about 72 GPa, current commercial glass and glass-ceramic substrates have elastic moduli of about 85 and 93 GPa, respectively. These modest increases may be insufficient to provide sufficient rigidity in 15 mil thick disks. Substantially higher elastic moduli can be achieved with ceramic materials such as alumina (380 GPa), silicon carbide (420 GPa), or mullite (220 GPa). However, these materials are more difficult to polish to the required surface smoothness. One solution is to coat a stiff substrate with a thin coating of intermediate hardness, such as glass or amorphous alumina. In this way a composite substrate with both exceptional stiffness and smooth surfaces can be achieved with machining costs similar to that of glass or glass-ceramic substrates.

During drive shock tests nickel-phosphorous (NiP) coated aluminum substrates will suffer damage from head slap at acceleration levels of less than 500 G, whereas glass-ceramic disks do not suffer damage at levels up to 1000 G. The superior performance of glass and glass-ceramic materials over aluminum is attributable to their superior hardness and higher Young's modulus. In addition, the high thermal expansion coefficient of aluminum ($22\times10^{-6}/°$ C.) can result in significant warping of the substrate in drive environments where significant temperature gradients occur. Ceramic and glass-ceramic materials, typically having thermal expansion coefficients less than $10\times10^{-6}/°$ C., are more resistant to warping. This may be a key factor in maintaining data integrity at high area densities.

Ceramics however have their own limitations. Firstly, they are comparatively difficult to polish because of their grain structure, high harness, and high elastic moduli. Secondly, being insulators, it is not possible to apply an electrical bias thereto during sputtering of the tie and magnetic layers, as is done with aluminum based substrates. Thirdly, ceramics have poor static dissipation. A fourth limitation relates to the laser texturing of a landing zone on the disk, to prevent stiction of the head when it lands. Laser zone texturing of a NiP/aluminum substrate is straightforward due to its high absorbtivity and ductile nature. However, many ceramics, including currently used glasses and glass-ceramics, have a low absorbtivity for commercial infrared lasers, resulting in more difficult and less uniform texturing characteristics. In addition, laser heating of glasses will tend to locally destroy the chemically tempered zone, if it is present. These difficulties could be overcome by electrolessly coating the ceramic or glass-ceramic substrate with a thin, amorphous metallic film, preferably of NiP. However, the surface of a conventional ceramic is difficult to activate for electroless deposition. For extant glasses or ceramics an additional step of depositing a palladium activation layer prior to NiP coating is required, increasing manufacturing cost.

BRIEF SUMMARY OF THE INVENTION

The present invention provides an easy and relatively economical method of forming a cermet layer on the surface of a ceramic substrate (specifically, a porcelain substrate). The cermet layer can contain a sufficient concentration of elemental metal to enable the deposition of a NiP layer without the need for the deposition of a palladium activation layer. The cermet layer also offers other advantages. The elemental metal content in the cermet can modify the laser absorption characteristics of the substrate for laser texturing of landing zones. The cermet's surface is about 10% harder than the original ceramic surface, making it less susceptible to damage. The dispersed metal particles in the cermet may increase the resistance to crack propagation. The cermet layer can provide improved static dissipation.

Accordingly, in a first embodiment, is provided a method of forming a cermet layer on a porcelain substrate, comprising the steps of:

(a) providing a substrate made of a porcelain comprising one or more crystalline oxide phases dispersed in a glassy matrix, the glassy matrix containing 0.25 to 45.0 weight % of a reducible metal oxide having a reduction potential of between −1.0 and +3.5 E°/V, the weight % of the reducible metal oxide being based on the weight of the porcelain; and (b) heating the substrate in a reducing atmosphere to form on at least one surface thereof a layer of cermet comprising elemental metal which is a reduction product of the reducible metal oxide.

In a second embodiment, there is provided an article comprising a cermet layer on a porcelain substrate, made by the aforementioned process.

In a third embodiment, there is provided a method for making a magnetic recording disk, comprising the steps of:

(a) providing a disk-shaped substrate made of a porcelain containing a reducible metal oxide, both the porcelain and reducible metal oxide being as defined above;

(b) heating the substrate in a reducing atmosphere to form on at least one planar surface thereof a layer of cermet comprising elemental metal which is a reduction product of the reducible metal oxide; and (c) superposing a layer of a magnetic recording medium over of the layer of cermet.

In a fourth embodiment, there is provided a magnetic recording disk, comprising:

(a) a disk-shaped substrate made of a porcelain containing a reducible metal oxide, both the porcelain and reducible metal oxide being as defined above;

(b) a layer of cermet comprising elemental metal which is a reduction product of the reducible metal oxide, the layer being disposed on at least one planar surface of the substrate disk; and (c) a layer of a magnetic recording medium superposed over the layer of cermet.

BRIEF DESCRIPTION OF THE DRAWING(S)

Herein, reference numerals repeated from one figure to another denote the same or like elements.

DETAILED DESCRIPTION OF THE INVENTION

Figure 1:
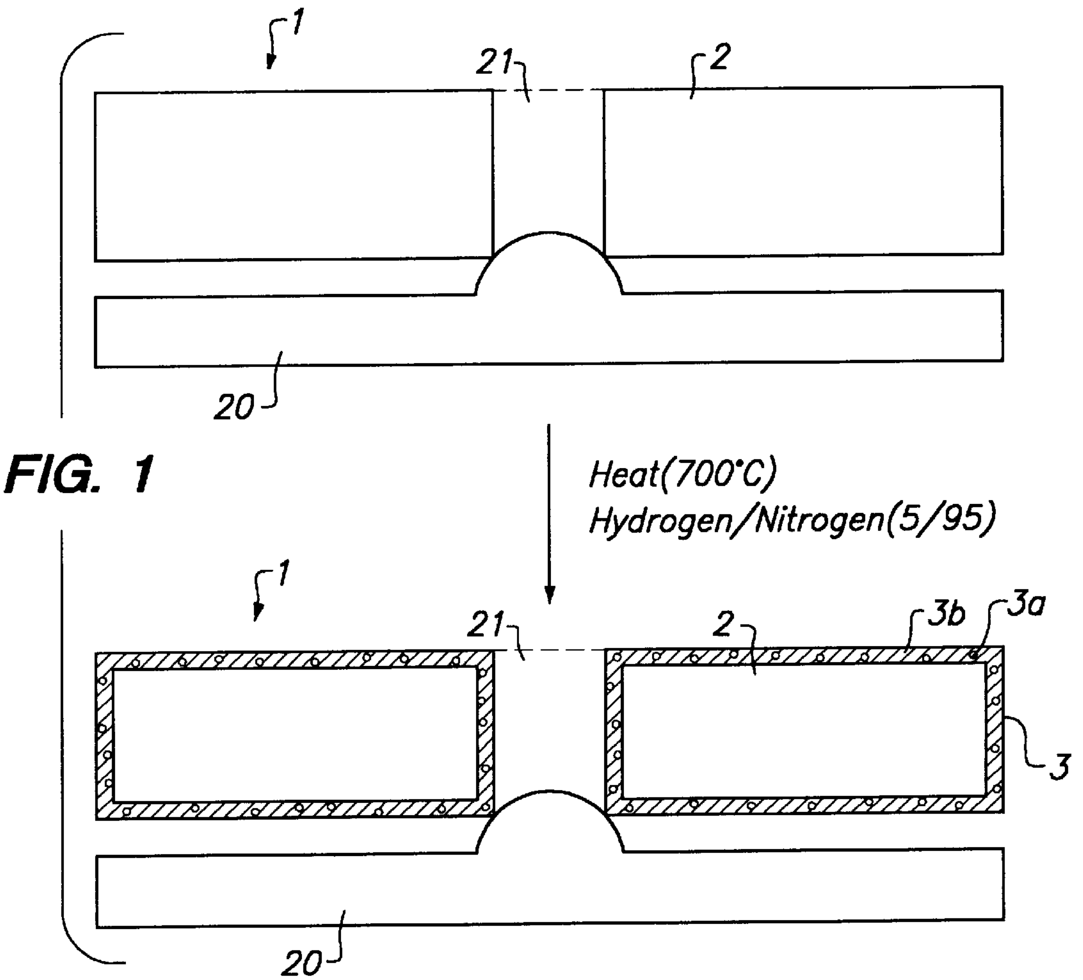
FIG. 1 depicts schematically the method of this invention.

We have discovered that heating a porcelain containing a reducible metal oxide, i.e., a metal oxide having a reduction potential between −1.0 and +3.5 E°/V (i.e., referenced against a standard hydrogen electrode), in a reducing atmosphere reduces the metal oxide in a thin surface layer to the corresponding elemental metal, the metal being dispersed in a ceramic matrix—that is, the reduction process forms a cermet layer on the ceramic surface. (A cermet has been defined as a composite material made by mixing, pressing, and sintering metal with a ceramic. See, e.g., *McGraw-Hill Dictionary of Scientific and Technical Terms*, p. 341 (5th Ed 1994). Herein, the term "cermet" is used to mean a composite in which metal is dispersed in a glassy matrix containing crystalline oxide phases, without regard to its method of preparation.) The reducible metal oxide can be an oxide or a combination of oxides of one or more metals selected from the group consisting of Ag, Au, Pd, Pt, Re, Rh, Ru, Ce, Bi, Cu, Co, Cr, Fe, Mo, Mn, Ni, Pb, Sb, Sn, Tc, V, and W. Preferably, the reducible metal oxide is an oxide or a combination of oxides of one or more metals selected from the group consisting of Bi, Cu, Ni, Mo, Sb, Sn, and W. Mixtures of reducible metal oxide, or complex metal oxides, can be used, for example nickel and bismuth oxides or copper and bismuth oxides. Or, different oxides of the same metal can be used, for example ferrous and ferric oxides or cuprous and cupric oxides.

Preferably, the porcelain of the substrate preferably has a composition defined as follows:

| Weight % | Component |
|---|---|
| 9 to 60 | $SiO_2$ |
| 30 to 87 | $Al_2O_3$ |
| 0 to 2.0 | $Fe_2O_3$ (optional) |
| 0 to 1.0 | $TiO_2$ (optional) |
| 0 to 0.5 | CaO (optional) |
| 0 to 0.5 | MgO (optional) |
| 0.0 to 8.0 | $K_2O$ and $Na_2O$ combined (optional) |
| 0.25 to 45.0 | reducible metal oxide (as defined above) |

The weight percents are based on the combined totals of the components. Preferably, the porcelain consists essentially of the components specified above, meaning that it may contain additionally minor amounts of other components, provided such other components do not alter its essential characteristics. The various oxides ($SiO_2$, $Al_2O_3$, etc.) may exist as such or as part of a complex oxide. Morphologically, the porcelain is characterized by one or more crystalline oxide phases (e.g., corundum, mullite, cristobalite, and the like) dispersed in a glassy matrix. Preferably, the reducible metal oxide is distributed substantially evenly throughout the glassy matrix.

Bismuth containing porcelains which are suitable for use in this invention are disclosed in Kinsman et al., U.S. Pat. Nos. 5,461,015 (1995) and 5,565,392 (1996), the disclosures of which are incorporated herein by reference. In these patents, a bismuth containing compound, such as bismuth subcarbonate, is used as a fluxing material for the preparation of a high strength porcelain. Conveniently, the bismuth fluxing material remains in the finished porcelain as bismuth oxide, which then can be utilized as the reducible metal oxide for the process of the instant invention.

The porcelain is made from a green body of precursor material, formed into a desired shape and already containing the reducible metal oxide dispersed throughout. The green body is sintered (fired) at an elevated temperature to convert it into the porcelain. The sintering temperature is typically between 900 and 1450° C., depending on the green body's chemical constitution, the particle size of the precursor material, the type and amount of fluxing agent present, and like factors. The sintering time will depend on the sintering temperature, as well as the aforementioned factors affecting the sintering temperature, as can be readily determined by one skilled in the art. The sintering process may be according to a complex heating schedule, such as with the initial heating at a lower temperature, for example at 200 to 700° C. for 1–20 hr, to ensure removal of volatiles followed by different lengths of time at incremental temperatures. The sintering step for making the porcelain normally takes place in the presence of air (i.e., oxygen, or an oxidizing atmosphere) and is not to be confused with the heating step of this invention for making the cermet layer, which takes place in a reducing atmosphere and is practiced on the porcelain (and not on its precursor green body).

Those skilled in the art will appreciate that the parameters provided following are representative ones for illustrating the invention and do not necessarily denote limitations thereof. The ceramic can be heated to a temperature between 300 and 1,200° C., preferably between 600 and 700° C., for a period of between 0.5 and 24 hr. Examples of suitable reductants for the reducing atmosphere include carbon monoxide, hydrogen, ammonia, butane, propane, ethane, and methane. The reductants may be used alone, or mixed with non-reactive gas such as nitrogen, argon, or helium, or with each other. Specific preferred reducing atmospheres are carbon monoxide, hydrogen-nitrogen (typically about 5 volume % hydrogen), methane, and methane-nitrogen. The reductant gas can be passed through the reducing chamber at flow rates of between 70 and 1,200 mL/min. Preferably, the cermet layer is between $5\times10^{-3}$ and 1000 $\mu$m thick, as can be determined with a scanning electron microscope (SEM). Also preferably, the cermet layer is substantially uniform in thickness.

Turning now to related art, it is known to form a cermet body by subjecting certain other kinds of ceramics to a reducing atmosphere. However, those ceramics lack the glassy matrix which characterizes the above described porcelain. The glassy matrix here acts as a barrier preventing the reductant from penetrating deeply into the bulk of the ceramic and thus limiting reduction to a thin surface layer. (If reduction were to take place throughout the entire bulk of the ceramic, advantageous physical properties of the ceramic might be compromised.) Other ceramics lack the glassy matrix and are substantially more permeable to the reductant; if one of them is subjected to the same reducing step, it will be entirely converted into a cermet because reduction will not be limited to a thin surface layer. Alternatively, it is known to diffuse a metal oxide vapor such as tungsten oxide into selected regions of a ceramic and then reducing the metal oxide to form a cermet region in the ceramic (Pinch et al., U.S. Pat. No. 3,985,919 (1976)). However, this method requires a vaporizable metal oxide, such as tungsten oxide. Also, Pinch's method was demonstrated with aluminum oxide, which lacks the glassy matrix characteristic of this invention's substrates, and reduction is not limited to a thin surface layer. In short, Pinch's method works only for limited combinations of metal oxide and substrate. Thus, without the present invention, there is no convenient generally applicable method available for forming a cermet layer on a ceramic substrate. The present invention enables a more generally useful method which can be practiced with a wide variety of substrates and metal oxides, even non-volatile ones.

In another related art, thick film resistors (TFR's) are made by coating a substrate (typically alumina) with an ink comprising a mixture of conductive metal oxides (and/or noble metals or their alloys) and an organic vehicle and sintering. Illustrative disclosures relating to TFR's include Hoffman, Ceramic Bul. Vol. 42, No. 9, pp. 490–493 (1963); Pesic, Microelectronics J., Vol. 19, No. 4, pp. 71–87 (1988) and Taketa et al., IEEE Trans. Parts, Hybrids, and Packaging, Vol. PHP-10, No. 1, pp. 74–81 (March 1974).

Gliemeroth, U.S. Pat. No. 4,017,291, discloses applying a coating of a metal onto a surface of a glass and then heating to a temperature sufficient to cause the metal to migrate from the surface of the glass into the glass.

The present invention is illustrated schematically in FIG. 1 for the specific embodiment in which the substrate is a disk 1 (shown in cross section) made of porcelain 2 as described above and shaped for making a magnetic recording disk. Disk 1 has a hole 21 through its center, for accepting a spindle via which the final magnetic recording disk can be rotated. Disk 1 is supported on a domed substrate 20, so that both planar surfaces of disk 1 are elevated above the surface of substrate 20 and are exposed to the reducing atmosphere. Disk 1 is heated at 700° C. in a 5:95 hydrogen:nitrogen atmosphere. At the end of the process, a layer 3 of a cermet is formed on the surface of the disk. Cermet 3 contains particles of metal 3*a* formed by reduction of the reducible metal oxide, dispersed in a ceramic matrix 3*b*.

Figure 2:
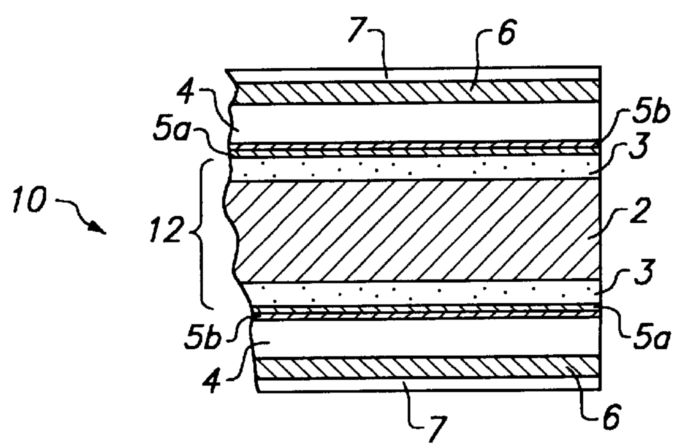
FIG. 2 is a partial cross-sectional view of a magnetic recording disk according to this invention.

Cermet-coated porcelains according to the present invention are useful as substrates for magnetic recording disks in hard disk drives. FIG. 2 is a partial cross-sectional view of a magnetic recording disk 10, including a substrate disk 12 made of a porcelain 2 and having a cermet layer 3 on both its planar surfaces. Substrate disk 12 has a magnetic recording medium 4 disposed or coated on both of its planar surfaces, although it may be coated on one side only (in which case cermet layer 3 may but need not be present in the uncoated side). Medium 4 need not contact cermet layer 3 directly, but may be separated therefrom by one or more non-magnetic intermediate layers. In this instance, a first intermediate layer 5*a* of nickel-phosphorus and a second intermediate layer 5*b* of chromium are shown. Intermediate layers may serve the function of providing a working material for a texturing operation or for enhancing the adhesion of medium 4 to cermet layer 3.

An advantage of the present substrate is that cermet layer 3 provides an improved surface adhesion-wise, compared to a conventional ceramic surface. Palladium activation, as is practiced with glass substrates, is not required. Palladium activation is undesirable because it requires rinses and palladium is a tenacious contaminant which can poison subsequent baths even when present in small amounts, at the ppm level. In contrast, the cermet layers of this invention can be activated towards NiP deposition to obtain improved adhesion properties with more benign agents such as boranes (e.g., with copper cermets). Other types of cermets, e.g., nickel cermets, are autocatalytic, meaning that no activation agents need be used to obtain NiP adhesion. Subsequent to deposition, the NiP layer can be laser textured.

Medium 4 can be any magnetic recording medium conventional in the art. Preferably, it is a magnetic metallic thin film deposited using a vacuum deposition technique such as sputtering. A chromium underlayer (shown as intermediate layer 5*b*) can be deposited first, to help nucleate and impart the desired magnetic properties to the thin film. The thin film itself is made of a ferromagnetic material, such as a binary, ternary, or quaternary alloy of cobalt (e.g., CoCrTa, CoPtCr, or CoPtNi). An advantage of the present invention is that the cermet layer is receptive to the application of an electrical bias during the sputtering step, something not feasible with ordinary ceramic substrates. Preferably, the thin film is overcoated with a protective layer 6 (e.g., sputter-coated diamond-like carbon) and/or a lubricant layer 7 (e.g., perfluoropolyether).

Medium 4 can also comprise ferromagnetic particles dispersed in a polymeric binder, although such a construction is disfavored because it has lower areal density compared to a thin film medium.

In a hard disk drive, a read/write head rests in contact with the disk surface when the disk is unpowered. To avoid damage to the data (information-bearing) zones of the disk, a non-information bearing zone, usually located near the inside or outside diameter, is reserved for "parking" the head. Such a zone is commonly referred to as the landing or parking zone. If the surface of the landing zone is too smooth, there may be excessive stiction and friction during disk start-up and stopping, causing wear to the head and the disk surface. Therefore, the landing zone is often intentionally textured (roughened), for example, by a laser as taught in Ranjan et al., U.S. Pat. No. 5,108,781 (1992). The cermet coating, due to its high light absorption, can be readily laser textured for the preparation of a landing zone. (Since it is preferred that the data zones of a disk be as smooth as possible, the disk is normally laser textured only in the landing zone(s).)

The invention may be further understood by reference to the following examples, which are provided by way of illustration and not of limitation.

EXAMPLE 1

Example 1 demonstrates the formation of a cermet layer in a porcelain having bismuth oxide as a reducible metal oxide. A porcelain disk with dimensions of ID 19.19±0.01 mm, OD 65.47±02 mm, thickness 0.63±0.01 mm, and containing 8.2 wt. % of Bi was placed in a tube furnace under a purge of $H_2/N_2$ 5/95 by volume (Praxair) at 800 mL/min. (The porcelain was made from 60 w % clay (5:1 w:w calcined clay and uncalcined clay), 30 w % feldspar, and 10 w % bismuth subcarbonate.) The disk was then heated at 4.8° C./min to various maximum temperatures and held there for various times, as noted below. After cooling to room temperature, the disk was removed and re-weighed. The results are provided in Table 1.

TABLE 1

| Sample No. | Maximum Temperature (° C.) | Time (hr) | Start Weight (mg) | End Weight (mg) | Weight Loss (mg) |
|---|---|---|---|---|---|
| 1 | 600 | 2 | 5334.9 | 5334.2 | 0.7 |
| 2 | 600 | 10 | 5347.4 | 5346.2 | 1.2 |
| 3 | 800 | 10 | 5331.3 | 5325.5 | 5.8 |

These results indicate that the stronger the reducing conditions (higher temperature and/or longer time), the more reduction occurs (as indicated by weight loss).

Figure 3:
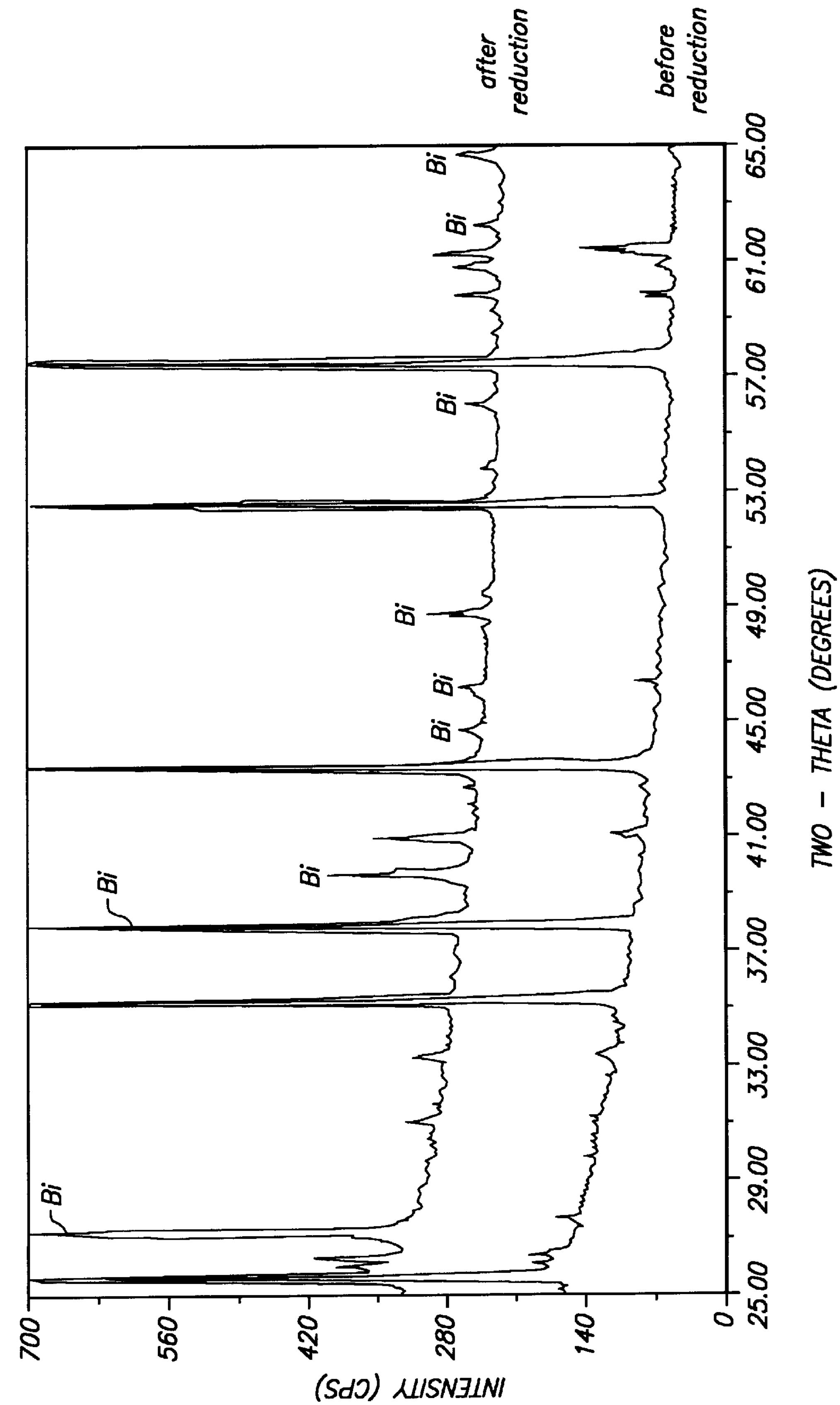
FIG. 3 is an X-ray diffraction pattern showing the formation of bismuth metal at the surface of a porcelain after reductive treatment, for an embodiment in which the reducible metal oxide is bismuth oxide.

FIG. 3 shows "before" and "after" X-ray diffraction traces for one of the disks. The "after" trace has peaks corresponding to elemental bismuth, which are absent from the "before" trace. SEM analysis provided further confirmation of the formation of the cermet layer. At 2,500× magnification, an SEM micrograph clearly showed a substantially uniformly thick cermet layer about 10 μm thick formed on top of the porcelain substrate, with elemental bismuth visible as light dots or specks within the cermet layer.

EXAMPLE 2

Example 2 demonstrates laser texturing of a cermet layer. The disk of Example 1, Sample No. 2 was laser textured using a 1.06 μm laser (SpectraPhysics. Mountain View, Calif.) and an energy level of 3 μJ/pulse. A surface with crater-like morphology was obtained after the laser's impact. A control experiment on a disk made of the same porcelain composition but without the cermet layer formed according to this invention showed no response to the laser at even energies of 10 μJ/pulse.

EXAMPLE 3

Example 3 demonstrates the invention for the instance in which the reducible metal oxide is a combination of nickel oxide and bismuth oxide. A porcelain precursor composition containing the following components was prepared: clay (22.3 wt %), feldspar (9.6 wt %), alumina (28.7 wt %), nickel oxide (34.7 wt %), and bismuth subcarbonate (3.8 wt %) by wet milling, drying and sifting to less than 80 μm particle size. The powder was compacted uniaxially to form a green body and sintered in air at a heating rate of 2° C./min to, in one case, 1,300° C. and, in the other case, 1,400° C., where it was held for 6 hr. The weight change in the green body was about 5 wt % in both cases and the linear shrinkage was 18% and 17.5%, respectively. The porcelain was then fired in an $H_2/N_2$ 5/95 v/v gas mixture to form a cermet surface thereon. The results are provided in Table 2.

TABLE 2

| Sample No. | Sintering Temperature (° C.) | Starting Weight (mg) | Ending Weight (mg) | Weight Loss (mg) |
|---|---|---|---|---|
| 4 | 1,300 | 5,956.8 | 5,950.7 | 6.1 |
| 5 | 1,400 | 6,402.5 | 6,397.8 | 4.7 |

EXAMPLE 4

Example 4 also demonstrates the invention for the instance in which the reducible metal oxide is a combination of nickel oxide and bismuth oxide. A porcelain precursor material containing the following components was prepared: clay (23.1 wt %), feldspar (10.9 wt %), alumina (22.4 wt %), nickel carbonate (38.5 wt %), and bismuth subcarbonate (5.1 wt %) by wet milling, drying, and calcining at 350° C. for 4 hr. The calcined powder was then sifted to less than 80 μm particle size, uniaxially compacted, and sintered in air at a heating rate of 2° C./min to 1,300° C. in the case of one specimen and to 1,400° C. in the case of another specimen, where it was held for 6 hr. The weight change was about 9.5 wt % in both cases and the linear shrinkage was 26% and 25%, respectively. Subsequent firing of the 1,300° C. specimen in $H_2/N_2$ 5/95 v/v gas mixture at 800° C. for 5 hr produced a porcelain having a 0.5 mg weight loss with a cermet surface layer. One of the specimens was subjected to a nickel-phosphorus coating procedure, with success. The nickel cermet layer was autocatalytic towards the NiP coating; i.e., no activation was needed to obtain a well-adhered NiP coating.

EXAMPLE 5

This example demonstrate the preparation of a cermet layer on a porcelain wherein the reducible metal oxide is a combination of copper and bismuth oxides. Porcelain precursor compositions were made according to Table 3.

TABLE 3

| | Sample No. | | |
|---|---|---|---|
| Component (wt %)[a] | 6 | 7 | 8 |
| Huber 90C Calcined Clay[b] | 47.0 | 58.9 | 60.0 |
| Polygloss Uncalcined Clay[c] | 9.0 | 9.8 | 10.0 |
| Feldspar[d] | 22.0 | 19.6 | 22.5 |
| Copper (II) Hydroxide[e] | 15.0 | 7.8 | 5.0 |
| Bismuth Subcarbonate[f] | 7.0 | 3.9 | 2.5 |

[a]Based on solids content of the slurries.
[b]Premilled slurry containing 48.7% solids and with average particle size of 0.68 μm; clay available from J. M. Huber Corp., Macon, Georgia.
[c]Premilled slurry containing 51.9% solids and with average particle size of 0.2 μm; clay available from J. M. Huber Corp., Macon, Georgia.
[d]Premilled slurry containing 56.7% solids and with average particle size of 1.01 μm.
[e]Precipitated with ammonium hydroxide from copper nitrate solution. 90% yield on conversion to hydroxide assumed.
[f]Premilled slurry with 33.8% solids with average particle size of 0.79 μm.

The four slurried components were combined and mixed for about 15 min with a pneumatic overhead mixer. Copper nitrate solution was added and mixing was continued for another 30 min. Ammonium hydroxide was added dropwise to the mixture until the pH reached 7–8, to precipitate copper hydroxide. The slurry was stirred for about 15 min more and then filtered. The filter cake was reslurried with deionized water and filtered again. The filter cake was dried, ground, and sieved through an 80 μm screen. The powder was compacted uniaxially, pressed into disks, and sintered in air at 2° C./min to various peak temperatures where they were held for 6 hr to convert the precursor compositions to porcelain. The porcelain bodies were then fired in $H_2/N_2$ 5/95 v/v at 800° C. to form a cermet layer, with weight changes as noted in Table 4.

TABLE 4

| Sample No. | Sintering Temperature (° C.) | Dwell Time of Reduction Step (hr) | Starting Weight (mg) | Ending Weight (mg) | Weight Loss (mg) |
|---|---|---|---|---|---|
| 6 | 950 | 5 | 4533.0 | 4530.7 | 2.3 |
| 7 | 1,050 | 5 | 4103.3 | 4101.4 | 1.9 |
| 8 | 1,130 | 3 | 4787.5 | 4787.1 | 0.4 |

We have discovered that the use of a copper hydroxide or oxide fluxing or sintering agent, alone or in combination with bismuth or another oxide, is advantageous in enabling a lower sintering temperature (maximum of 1130° C. in this instance).

EXAMPLE 6

Example 6 demonstrates electroless Ni-P plating of a copper-cermet layer on a porcelain substrate, using a non-noble metal initiator such as dimethylamine borane (Enplate Catalyst 104, Enthone-OMI, West Haven, Conn.). The sample used was Sample No. 6 from the previous example. The Ni-P film adhered well to the cermet surface and also appeared to cover defects which were about 1 μm or less in size. A magnetic medium can be deposited on the Ni-P film (about 10 μm thick) by conventional methods as described hereinabove.

EXAMPLE 7

This example demonstrate the preparation of a cermet layer on a porcelain wherein the reducible metal oxide is a combination of iron (II) and bismuth oxides. Slurries of Huber 90C calcined clay (49.4%), Polygloss uncalcined clay (10.5%), feldspar (24.7%), and bismuth subcarbonate (8.2%), prepared as described in Example 5, were combined and mixed for about 15 min with a pneumatic overhead mixer. Iron (II) chloride solution (0.2 M) was added and mixing was continued for another 30 min. Approximately 100 mL of ammonium hydroxide was added dropwise, to precipitate the iron (II) hydroxide. Stirring was continued for an additional 15 min and the slurry was filtered. The filter cake was reslurried and mixed until all the lumps were gone and then filtered again. The powder was dried and sifted to less than 80 μm particle size, compacted uniaxially, and sintered in air at 2° C./min to 1,200° C. where it was held for 6 hr, to produce a porcelain. The porcelain was then fired in $H_2/N_2$ 5/95 v/v at 800° C. for 5 hr to form a cermet layer. A weight loss of 3224.1−3222.1=2.0 mg was observed.

EXAMPLE 8

This comparative example demonstrates what happens when a substrate not according to this invention is used. A dense cordierite ceramic body was prepared according to Dupon et al., U.S. Pat. No. 5,130,280. This ceramic body did not contain the glassy matrix characteristic of porcelains used in this invention. It was fired in $H_2/N_2$ 5/95 v/v gas mixture at 600° C. for 1 hr, with a weight loss of 8.9 mg (start 3,800.9 mg; end 3,792.0 mg). The ceramic body was found to have elemental bismuth dispersed throughout. A cermet surface layer was not obtained; rather, the entire body was converted into a cermet.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims. In particular, those skilled in the art will appreciate that while the invention has been primarily described in the context of forming a cermet layer on a disk-shaped substrate for making hard disk drives, the method is applicable to the formation of cermet layers on substrates of other shapes for other applications where the presence of the cermet layer would be advantageous.

What is claimed is:

1. A method for making a magnetic recording disk, comprising the steps of:

(a) providing a disk-shaped substrate made of a porcelain comprising one or more crystalline oxide phases dispersed in a glassy matrix, the glassy matrix containing 0.25 to 45.0 weight % of a reducible metal oxide having a reduction potential of between −1.0 and +3.5 E°/V, the weight % of the reducible metal oxide being based on the weight of the porcelain;

(b) heating the substrate in a reducing atmosphere to form on a planar surface thereof a layer of cermet comprising elemental metal which is a reduction product of the reducible metal oxide; and (c) superposing a layer of a magnetic recording medium over of the layer of cermet.

2. A method according to claim 1, further comprising the step of disposing at least one intermediate layer over the layer of cermet prior to superposing the layer of magnetic recording medium thereover.

3. A method according to claim 2, wherein an intermediate layer of nickel-phosphorus and another intermediate layer of chromium are successively disposed over the layer of cermet prior to superposing the layer of magnetic recording medium thereover.

4. A method according to claim 3, further including the step of laser texturing the layer of nickel-phosphorus.

5. A method according to claim 3, further including the step of activating the layer of cermet to improve its adhesion properties towards the layer of nickel-phosphorus.

6. A method according to claim 1, further comprising the step of applying at least one overlayer over the layer of magnetic recording medium.

7. A method according to claim 6, wherein a protective overlayer and a lubricating layer are applied over the layer of magnetic recording medium.

8. A method according to claim 1, wherein the layer of magnetic recording medium is superposed by vacuum deposition.

9. A method according to claim 8, wherein an electrical bias is applied to the layer of cermet during the vacuum deposition.

10. A method according to claim 1, further comprising the step of laser texturing the layer of cermet.

11. A magnetic recording disk, comprising:

(a) a disk-shaped substrate made of a porcelain comprising one or more crystalline oxide phases dispersed in a glassy matrix, the glassy matrix containing 0.25 to 45.0 weight % of a reducible metal oxide having a reduction potential of between −1.0 and +3.5 E°/V, the weight % of the reducible metal oxide being based on the weight of the porcelain;

(b) a layer of cermet comprising elemental metal which is a reduction product of the reducible metal oxide, the layer being disposed on at least one planar surface of the substrate disk; and (c) a layer of a magnetic recording medium superposed over the layer of cermet.

12. A magnetic recording disk according to claim 11, further comprising at least one intermediate layer disposed between the layer of cermet and the layer of magnetic recording medium.

13. A magnetic recording disk according to claim 12, wherein an intermediate layer of nickel-phosphorus and another intermediate layer of chromium are disposed between the layer of cermet and the layer of magnetic recording medium.

14. A magnetic recording disk according to claim 11, wherein the substrate disk has on both planar surfaces thereof a layer of cermet and a layer of magnetic recording medium disposed thereover.

15. A magnetic recording disk according to claim 11, wherein the layer of magnetic recording medium has applied thereover at least one overlayer.

16. A magnetic recording disk according to claim 15, wherein the layer of magnetic recording medium has applied thereover a protective overlayer and a lubricating overlayer.

17. A magnetic recording disk according to claim 11, wherein the layer of magnetic recording medium is a vacuum-deposited metallic thin film.

18. A magnetic recording disk according to claim 11, wherein the layer of cermet has been laser textured.

19. A magnetic recording disk according to claim 11, wherein the reducible metal oxide is an oxide or a combination of oxides of one or more metals selected from the group consisting of Ag, Au, Pd, Pt, Re, Rh, Ru, Ce, Bi, Cu, Co, Cr, Fe, Mo, Mn, Ni, Pb, Sb, Sn, Tc, V, and W.

20. A magnetic recording disk according to claim 11, wherein the layer of cermet is between $5\times10^{-3}$ and 1,000 $\mu$m thick.

21. A magnetic recording disk according to claim 11, wherein the one or more crystalline oxide phases in the porcelain are selected from the group consisting of corundum, mullite, and cristobalite.

22. A magnetic recording disk according to claim 11, wherein the porcelain comprises 9 to 60 weight % $SiO_2$, 30 to 87 weight % $Al_2O_3$, 0 to 2.0 weight % $Fe_2O_3$, 0 to 1.0 weight % $TiO_2$, 0 to 0.5 weight % CaO, 0 to 0.5 weight % MgO, 0.0 to 8.0 weight % of $K_2O$ and $Na_2O$ combined, and 0.25 to 45.0 weight % of the reducible metal oxide.

* * * * *